Figure 1B:
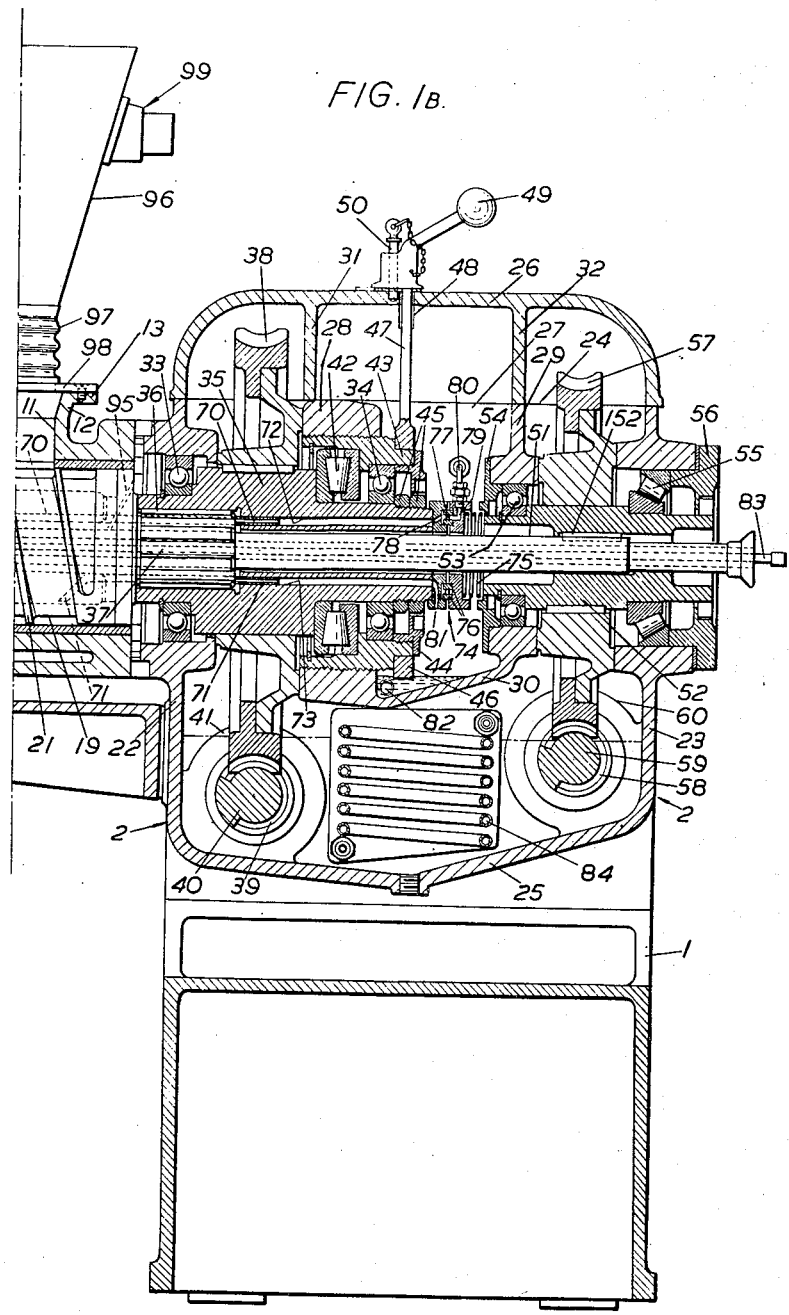
Figure 3:
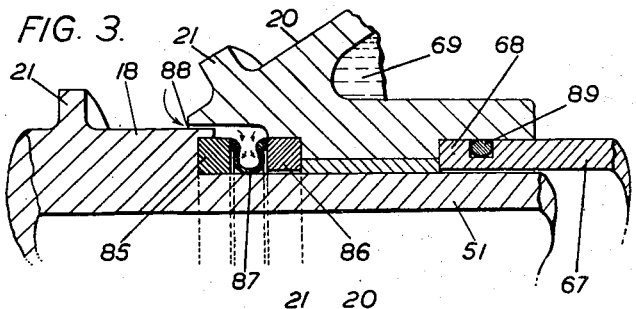
Figure 4:
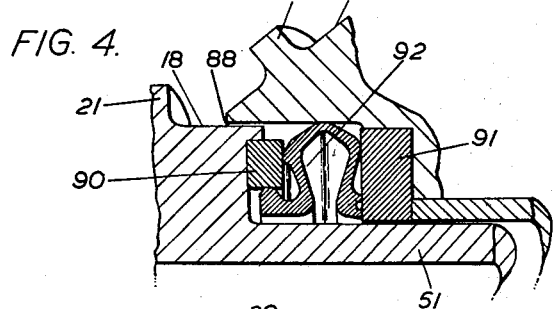
Figure 5:
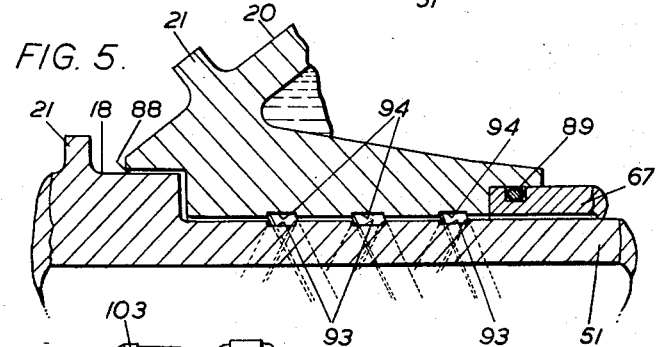

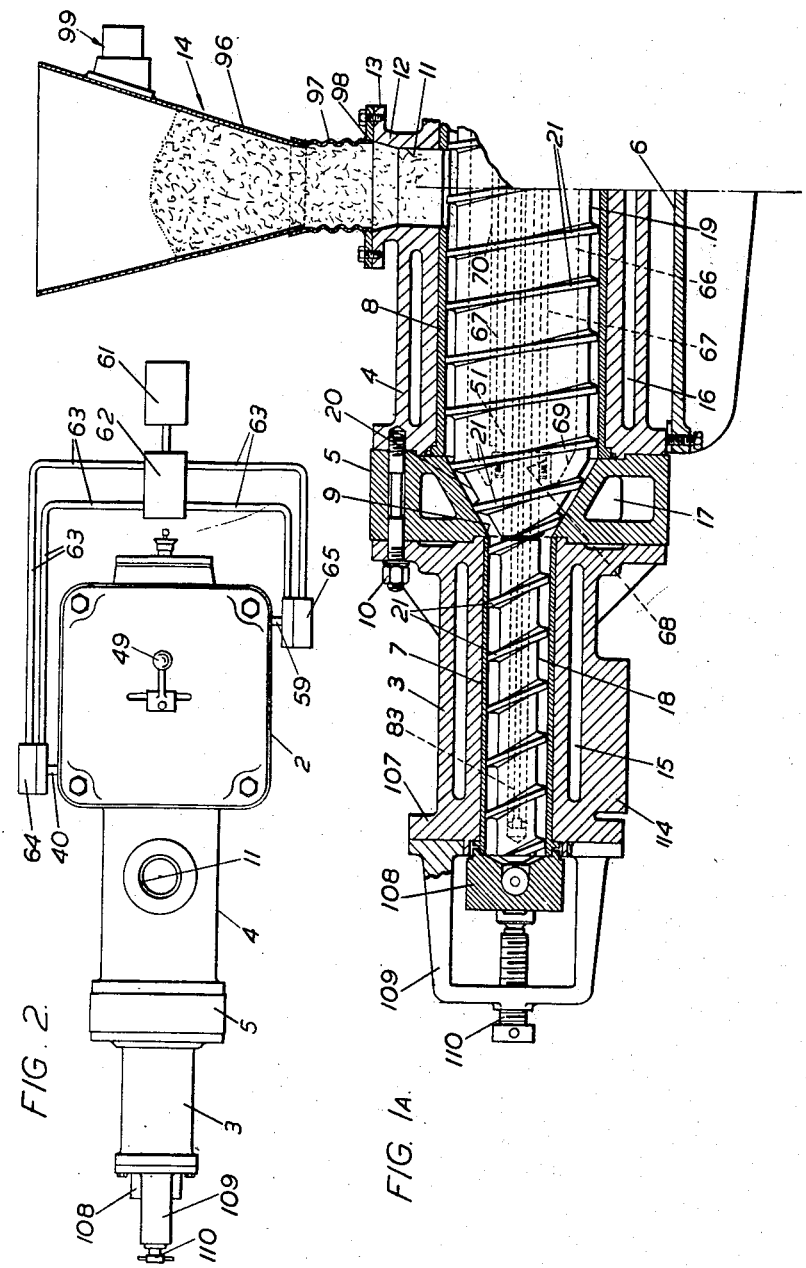

March 5, 1957

A. B. F. G. RICHARDSON 2,783,498

SCREW EXTRUSION MACHINES

Filed Oct. 13, 1953

4 Sheets-Sheet 2

Inventor
Arthur Bruce Frazer Gillespie Richardson

By
Hopes, Leonard & Buell
his Attorneys

March 5, 1957 A. B. F. G. RICHARDSON 2,783,498
SCREW EXTRUSION MACHINES

Filed Oct. 13, 1953 4 Sheets-Sheet 3

Inventor
Arthur Bruce Frazer Gillespie Richardson

By
Attorneys

March 5, 1957  A. B. F. G. RICHARDSON  2,783,498
SCREW EXTRUSION MACHINES
Filed Oct. 13, 1953  4 Sheets-Sheet 4
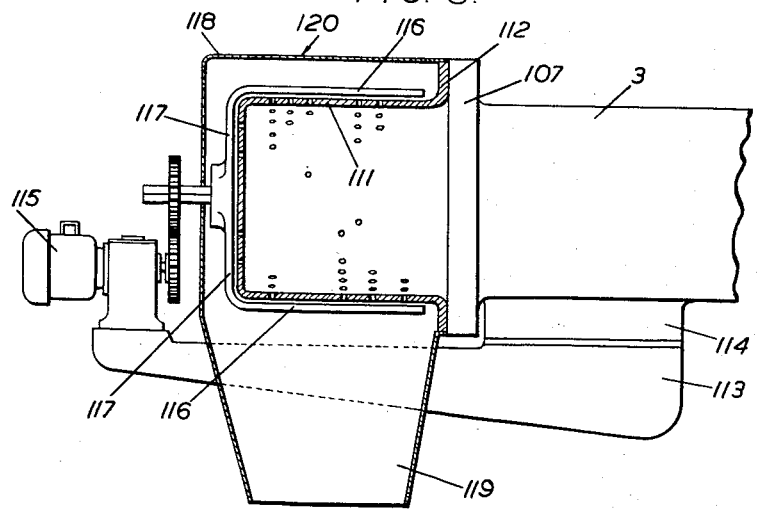
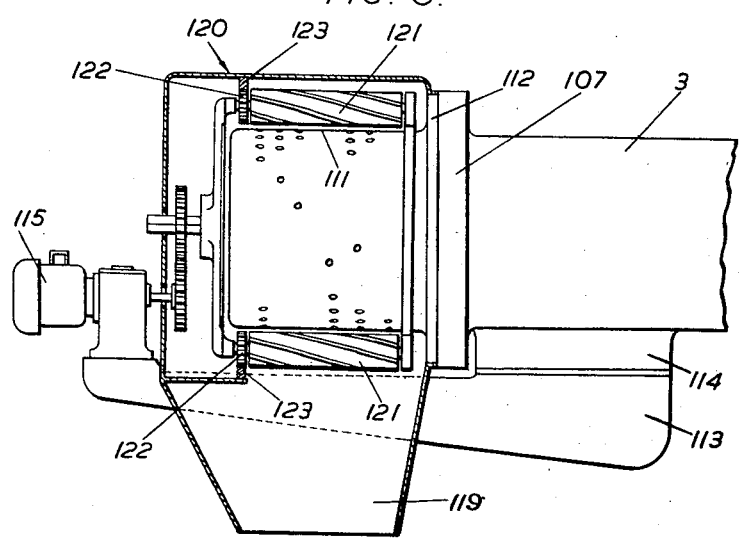
Inventor
Arthur Bruce Frazer Gillespie Richardson
By
Attorneys

United States Patent Office 2,783,498
Patented Mar. 5, 1957

2,783,498

SCREW EXTRUSION MACHINES

Arthur Bruce Fraser Gillespie Richardson, Leigh, England, assignor to British Insulated Callender's Cables Limited, London, England, a British company Application October 13, 1953, Serial No. 385,854

Claims priority, application Great Britain October 23, 1952

12 Claims. (Cl. 18—12)

This invention relates to screw extrusion machines for extruding stock such as rubber and synthetic thermoplastics, of the kind in which stock in powder, pellet or chip form fed into one end of the barrel of the machine is acted upon by a rear part of the feed screw which serves to exert a milling action on the stock and to deliver it to a front part of the screw which builds up pressure in the stock and extrudes it through an extrusion orifice of appropriate form.

By the present invention I provide an improved form of screw extrusion machine of the type described, which term when used here and hereafter in the claims of this specification means a machine of the kind described in the preceding paragraph. In accordance with my invention the feed screw of this improved form of machine comprises a rear portion of large diameter compared with that of a front portion from which it is separated by an intermediate portion of tapered form. This tapered portion of the screw may be of conical form or it may be of conoidal form. The front and rear portions of the screw are preferably of cylindrical form though one or both of these portions may taper in the same sense as but to a much smaller degree than the intermediate portion. The barrel in which the composite screw works is of corresponding form.

This novel form of feed screw has important advantages over a feed screw of uniform diameter or one that tapers uniformly from end to end. One advantage is that the overall length of the screw can be reduced to a considerable extent as compared with a screw of uniform diameter having the same spiral length of thread but having, as is customary, a high ratio of length to diameter. Another advantage is that the large diameter rear portion of the screw facilitates accurate control of the temperature of the stock between that portion and the surrounding wall of the barrel. A further advantage is that the tapered intermediate portion of the screw results in a comparatively local zone in which the intensity of the masticating or milling action is controlable during the running of the machine without varying or substantially varying the effect exerted upon the stock by the remaining portions of the screw. This control is obtained by providing means for adjusting the screw axially relative to the barrel. By moving the screw axially towards the rear of the barrel the clearance between the threads of the tapered intermediate portion of the screw and the surrounding tapering wall of the barrel is increased, thereby allowing stock to slip back over the tops of the threads of the tapered intermediate portion, thus increasing the working of the stock. Axial adjustment of the screw may be obtained by providing on the periphery of the housing for the thrust bearing supporting the feed screw at its rear end a screw thread which engages an internally screw threaded fixed support. Angular movement of the housing in its support will then result in axial movement of the feed screw. Rotation of the housing may be effected by a self-locking worm drive or the housing may be pulled round by hand and be locked in any required angular position by other means.

I prefer to make the front portion of the feed screw a separate member and to provide means for driving this front portion independently of the intermediate and rear portions which I prefer to drive together. By doing this I am able to impose an additional control upon the effectiveness as a stock-working device of the tapered intermediate portion of the screw. For example, by reducing the speed of the front portion of the screw relative to the speed of the intermediate and rear portions, the rate of volumetric pick-up of the front portion can be made less than the rate of volumetric throw of the rear portion, with the result that the rate at which the stock is pushed back over the tapered intermediate portion is increased. As the rear portion of the feed screw is of substantially greater diameter than the front portion the drive to the front portion can conveniently be applied from the rear by a torque tube passing through axial bores in the intermediate and rear portions of the screw and through the bearing or bearings for these portions and into a further bearing or bearings, a drive being applied to the torque tube to the rear of the bearing or bearings supporting the intermediate and rear portions. A drive to the rear portion of the screw may be applied to its tubular shaft at a point between the rear end of the barrel and the bearing or bearings supporting the torque tube driving the front portion of the screw.

Figure 6:
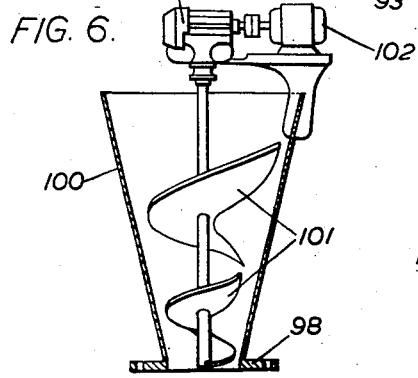
Figure 7:
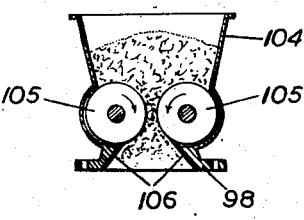

To enable the invention to be more fully understood and readily put into practice a detailed description of an example of a screw extrusion machine constructed in accordance with the invention will now be given with the aid of the accompanying drawings, wherein:

Figure 1A is a side view, partly in elevation but mainly in longitudinal section, of a front portion of the complete machine, Figure 1B is a continuation of Figure 1A and is a side view, partly in elevation, but mainly in longitudinal section, of the remaining part of the machine, Figure 2 is a diagrammatic plan showing a preferred form of power drive to the machine shown in Figures 1A and 1B, Figures 3, 4 and 5 are fragmental sections drawn to a larger scale than Figures 1A and 1B and showing alternative forms of seal between the member forming the front portion and the member forming the intermediate and rear portions of the feed screw, Figures 6 and 7 are diagrammatic views showing alternative forms of forced feeding devices that may be fitted to the machine shown in Figures 1A and 1B in place of the feeding device there shown, Figures 8 and 9 are diagrammatic views showing examples of two alternative forms of delivery heads that may be fitted to the machine shown in Figures 1A and 1B in place of the core-covering head there shown.

Reference will first of all be made to Figures 1A and 1B only, from which it will be seen that the machine comprises a pedestal 1 supporting a main housing 2, to one end face of which is bolted the rear end of a three-part barrel comprising a cylindrical front portion 3, a cylindrical rear portion 4 of large diameter compared with that of the front portion 3 and an intermediate portion 5. Additional support for the rear portion is provided by the bracket 6 also bolted to the adjoining end wall of the housing 2. The front and rear portions 3 and 4 which are of approximately the same length as one another are fitted with smooth-bored renewable liners 7 and 8, respectively, the internal diameter of the liner 8 being about two and one half times that of the liner 7. The intermediate portion 5 of the barrel has an axial length of about one quarter of that of the front portion 3 and has a smooth conical bore 9 of which the diameter at its rear end corresponds with that of the bore of the lined rear portion 4 of the barrel and at its front end corresponds with that of the bore of the lined front portion 3 of the barrel. The three barrel portions 3, 4 and 5 are held together by stud bolts 10. Towards the rear end of the rear portion of the barrel there is provided in the upper wall of the barrel a lateral feed opening 11 surrounded by a wall 12 forming a hopper around the rim of which is a flange 13 for the attachment of a forced feed device 14. The walls of each portion of the barrel are chambered as shown at 15, 16 and 17 to permit of the application of a jacket of a heating or a cooling fluid to each portion of the barrel.

The front portion 18 of the feed screw, which portion is a working fit in the lined front portion 3 of the barrel, is a separate member from the member forming the rear and intermediate portions, 19 and 20, respectively, of the feed screw. The rear portion 19 is a working fit in the lined rear portion 4 of the barrel. The intermediate portion 20 is a working fit in the conical bore 9 of the intermediate portion of the barrel when the member of which it forms the front end is in its extreme forward operative position. The threads 21 on all three portions of the feed screw are single-start threads of the same hand and the same pitch, those on the intermediate portion being a continuation of those on the rear portion.

The main housing 2 comprises an open trough-shaped lower part comprising front and rear end walls 22 and 23 united by side walls 24 and a base wall 25, and an upper part forming a cover 26 for the lower part. Within the lower part of the housing is an inner housing or chamber 27 comprising end walls 28 and 29 and a base wall 30, all of which extend between and are integral with the side walls 24 of the outer housing 2, which side walls also form the side walls of this inner housing. The cover 26 has dependent transverse walls 31 and 32 which meet the end walls 28 and 29, respectively, of the inner housing and isolate the latter from the outer housing. Journalled in a ball-bearing 33 housed in the front end wall 22 of the main housing and in a ball-bearing 34 mounted in the front end wall 28 of the inner housing, is a driving sleeve 35, the front end of which is internally splined at 36 to receive an externally splined spigot 37 projecting from the rear end of the member forming the intermediate and rear portions, 20 and 19, of the feed screw. This driving sleeve 35 carries a worm wheel 38 which is driven by a worm 39 on a transverse driving shaft 40 turning in bearings 41 and projecting through one side wall 24 of the main housing. The thrust exerted by the intermediate and rear parts of the screw on the driving sleeve 35 is taken up by a roller thrust bearing 42 housing in an externally screw-threaded sleeve 43 which screws into the apertured front end wall 28 of the inner housing 27. The rear end of the sleeve 43 also houses the journal bearing 34 which is held in place by the cover plate 44, the driving sleeve 35 being held on to its thrust bearing 42 by lock nuts 45. On the rear end of the sleeve 43 is clamped a strap 46 having a radially extending spoke 47 which projects through an arcuate slot 48 in the cover 26 and terminates in a handle 49 by means of which a limited angular movement can be imparted to the sleeve 43 thus imparting a limited axial movement to the thrust bearing 42 and hence to the intermediate and rear portions 20 and 19 of the feedscrew. A locking device 50 is provided to set the sleeve 43 in any one of a limited number of angular positions. To obtain the required axial movement, using only a small angular movement of the sleeve 43, the thread on its external surface may be a multi-start thread.

The front portion 18 of the feed screw has a rearwardly extending hollow stem which passes through the intermediate and rear portions of the screws 20 and 19, and through their driving sleeve 35 and the inner housing 27 to form a torque tube 51 whose rear end is keyed to a second driving sleeve 52. This sleeve is supported at its front end by a ball-bearing 53 retained in the apertured rear wall 29 of the inner housing 27 by a cover plate 54. It is supported at its rear end by a coned roller bearing 55 housed in the rear end wall 23 of the main housing 2 and supported against the thrust on it by a cover plate 56. The driving sleeve 52 carries a worm wheel 57 which is driven by a worm 58 on a shaft 59 which is supported in bearings 60 and at one end projects through the same side wall 24 of the main housing as the shaft 40, or through the opposite side wall. To take care of possible differences between the thermal expansion of the torque tube and that of the main housing and the barrel, the torque tube may be keyed to its driving sleeve 52 by a feather key 152, and a limited relative movement between the two be permitted by providing a clearance between the front end of the key and the front end wall of the keyway in the sleeve and a clearance between the step in the torque tube and the step in the bore of the sleeve, as shown in the drawing.

The shafts 40 and 59 may be driven in any convenient manner which will permit of the speed of one being varied relative to that of the other. For example, two variable speed motors may be used, one for each shaft. Alternatively constant speed motors may be used, each driving its shaft 40 or 59 through a hydraulic or mechanical infinitely variable speed gear. A preferred arrangement comprises a single driving motor 61 driving the primary end 62 of a hydraulic variable speed gear feeding through mains 63 two secondary hydraulic motor units 64 and 65, one coupled to the shaft 40 and the other to the shaft 59, as shown diagrammatically in Figure 2.

Between its front and rear ends the bore of the rear portion 19 of the feed screw is enlarged to provide a chamber 66 which is converted into a closed annular chamber by a tube 67 of which the rear end is sealed into the stepped bore of the splined spigot 37 and of which the front end is sealed into an enlargement 68 of the rear end of the bore, of the intermediate portion 20 of the feed screw in which is an annular recess 69 forming an extension of the chamber 66. To enable hot or cold liquid or vapour to be circulated through the annular chamber 66 an inlet pipe 70 passes through the wall of the splined spigot 37 and extends almost to the front end of the chamber 66. A second pipe 71 also extends through the same wall but this terminates at the rear end of the chamber 66. The rear ends of both pipes 70 and 71 project beyond the splined spigot 37 and respectively fit into the front ends of two channels 72 and 73 running through the wall of the driving sleeve 35. On the rear end of this driving sleeve is fixed one part of a sealing gland 74, the other part of which is urged towards the first part by a spring 75 to hold the adjoining faces of the two gland parts in contact with a pair of concentric sealing rings 76 to form between them an annular chamber 77. This chamber communicates through a passage 78 with the passage 72 in the driving member and through a passage 79 with a fluid supply pipe 80. The other passage 73 in the driving member communicates with the interior of the inner housing 27 through a passage 81 in the wall of the gland part fixed to the driving sleeve. Spent circulating liquid drains to the bottom of the inner housing 27 from which it is carried away by a drain pipe 82. The supply of heating or cooling fluid to the front portion of the feed screw is a relatively simple matter. An axially positioned feed pipe 83 of small diameter extends from the rear end of the torque tube 51 almost to the front end of the front portion of the feed screw where it discharges fluid into the bore of that portion. This fluid returns through the clearance between the pipe 83 and the bore of the front portion of the screw and its torque tube 51 to escape at the rear end. By these heat-exchanging means independent control of the temperatures of the front portion and of the intermediate and rear portions of the feed screw is readily obtainable. The lower part of the main housing 2 contains a cooling coil 84 through which cold water or other liquid can be circulated to maintain the oil bath in the housing at the desired temperature.

In place of or in addition to the pipes 70 and 71 and the gland 74, slip rings may be mounted on the driving sleeve 35 which may be lengthened to accommodate them to the rear of the cover plate 44 of the rear bearing 34. Electric leads from these rings may pass through passages in the wall of this driving sleeve to electric heating elements located within the wall of the intermediate and/or rear portions of the feed screw. To permit the feed screw to be withdrawn without disconnecting the leads from the heating elements or the slip rings, provision can be made for detachable couplings, such as plug and socket couplings, between those parts of the leads that lie in the wall of the feed screw and those parts that lie in the wall of the driving sleeve 35.

Since the front portion 18 of the feed screw is adapted to be driven at speeds different from those at which the intermediate and rear portions are driven, it will generally be necessary to provide a seal between the two relatively rotatable parts to prevent or restrict stock escaping from the working chamber and flowing via the clearance between the torque tube 51 and the wall of the bore through which it passes rearwardly to its driving sleeve 52. This seal may be of any suitable form, three examples of such a seal being shown in Figures 3, 4 and 5 to which the reader's attention is now directed. In the arrangement shown in Figure 3, the shoulder between the front portion 18 of the feed screw and its torque tube 51 is recessed to receive a carbon ring 85. A similar ring 86 is placed against the step in the bore of the intermediate portion 20 of the feed screw. Between the two carbon rings is a U-section ring 87 of beryllium copper alloy whose edges bear against the faces of the carbon rings 85 and 86. A small annular gap 88 between parts 18 and 20 gives the stock slight access to the seal with the result that sufficient pressure is developed in the channel of the metal ring 87 to cause the edges of the ring to be held against the carbon rings. A sealing ring 89 will be noticed between the wall of the recess 68 in the rear face of the intermediate portion of the feed screw and the tube 67. This is for the purpose of excluding the cooling water or other fluid in the chambers 66 and 69 from the main seal. In the arrangement shown in Figure 4, a pair of carbon rings 90 and 91 are used in conjunction with an Ω-section beryllium copper ring 92, one wall of which is forced into engagement with the adjacent end face of the carbon ring 91 and the other with both the internal surface and end face of the carbon ring 90, by oil under high pressure fed to the channel of the metal ring 92 through the clearance between the tube 67 and the torque tube 51 and that between the driving sleeve 35 and the torque tube. In the third arrangement shown in Figure 5, the circumferential surface of the front end of the torque tube 51 and/or the internal surface of the bore of the intermediate section of the feed screw are furnished with helical grooves 93 and/or 94 of shallow rectangular section. When both members are grooved the grooves are of opposite hands. Stock leaking into the clearance between the front and intermediate portions of the feed screw is seized by the grooved surface or surfaces and impelled back towards the entrance 83. Under running conditions a substantial balance of pressure is obtained with the result that little or no stock escapes past the seal. Any that does so may be allowed to flow rearwardly to the rear end of the rear portion 19 of the feed screw and there be allowed to escape through an inclined passage 95 (Figure 1B).

The form of the forced feed device 14 will naturally depend upon the nature of the material to be processed by the machine. For granular material the device 14 may, as shown in Figures 1A and 1B, comprise a hopper 96 which is secured at its lower end by a flexible tube 97 to a mounting flange 98 and is fitted with an electromagnetic vibrator 99. When it is required to feed material in the form of a paste or dough the vibrator feed device shown in Figures 1A and 1B may be removed and replaced by a device of the type shown in Figure 6 and comprising a conical hopper 100 fitted with an interrupted spiral feed screw 101 driven at its upper end by a motor 102 through a reduction gear box 103. Alternatively, and when it is required to feed in stock in the form of a ribbon, a feed device of the type shown in Figure 7 and consisting of a hopper 104 incorporating a pair of power driven feed rolls 105 and scrapers 106 may be mounted over the feed opening 11 of the machine.

In order that the machine described with reference to Figures 1A to 7 may be used for various purposes, the front end of the front part 3 of the barrel is provided with a flange 107 to which delivery heads of various kinds may be bolted. Figure 1 shows the barrel fitted with an extrusion head 108 for extruding a covering of stock about a wire or cable core fed through the head in a direction normal to the axis of the machine. This head 108 is clamped to the front end face of the sleeve 7 of the barrel of the machine by a yoke 109 which is anchored to the barrel and carries a single clamping screw 110, as described and claimed in the specification of our prior Patent No. 2,607,953. When the machine is required to condition stock and pelletize it, the head 108 and yoke 109 may be replaced by a pelletizer head 120 of the kind shown in Figure 8. As will be seen, this essentially consists of a cylinder 111 having a perforate end wall and a perforate circumferential wall and having a flanged rim 112 around its open end which is bolted to the flange 107 on the barrel of the machine. A bracket 113 bolted to a face 114 on the underside of the machine barrel supports a variable speed motor 115 driving a group of cutting blades 116 and 117 which sweep over the perforate walls of the cylinder and cut the extruded filaments or ribbons of stock into short lengths which are collected by a hood 118 and delivered via the chute 119 into a convenient receptacle. Figure 9 shows a modified form of pelletizer head 120 in which, instead of the plain cutting blades 116 of the head of Figure 8, rotary blades 121 are provided which as they orbit round the perforate circumferential wall of the barrel 111 are driven in rotation, each about its own axis by means of a pinion 122 engaging a stationary ring of teeth 123 supported by the hood 118.

It will be appreciated that the relative diameters and lengths of the three portions of the feed screw of our improved machine will be chosen to suit the nature of the stock to be extruded and the way in which it is required to be worked. It will also be appreciated that it is not essential for the threads on all three portions of the feed screw to be single-start threads of the same pitch. Multi-start threads may be used on all portions of the feed screw or a multi-start thread may be used on one or two portions and a single-start thread on the remaining portion or portions. The pitch of the threads may also vary as between one portion of the screw and the remaining portions and/or over the length of each of the three portions. The form of the threads and the root depth may also vary as between one portion of the screw and the remaining portions and/or over the whole or a part of the length of each portion. In general, each of the three portions of the feed screw of my improved machine, may embody such of the well-known features of feed screw design as may be considered to be desirable having regard to the function of the particular portion concerned and to the nature of the stock to be dealt with. By way of example it is mentioned that a screw suitable for the production of tough rubber cable coverings from stock fed in cold in pellet form comprises front and rear portions of approximately equal lengths and an intermediate portion of about one quarter of the length of the front portion, the diameter of the rear portion being approximately twice that of the front portion and the pitch of the threads in the three portions being approximately the same and rather less than the diameter of the front portion of the screw. A machine of these relative dimensions can also be used for working and pelletizing rubber stock fed in in powder form and also for the production of plastic cable coverings and other extruded bodies of such material, since the various parts of the screw and of the barrel are adapted to be either heated or cooled as may be required.

In the description of the machine given with reference to the drawings it has been stated that the liners of the barrels have each a smooth bore. For some purposes it may however be an advantage to use a liner (or liners) having a non-smooth bore, for example liners having helical ribs on, or grooves in, its internal surface, and it will be understood that our invention is not limited to machines in which the outer wall of each of the three working chambers has a smooth internal surface.

What I claim as my invention is:

1. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, a barrel of corresponding form to said feed screw and surrounding it with a small clearance and comprising front and rear portions and an intermediate portion having a tapering wall, said barrel having a feed opening at its rear end and means for mounting a delivery head at its front end, means for rotatably supporting said screw in said barrel and means for axially adjusting said screw within said barrel forwards and rearwards to a limited extent to reduce and increase the clearance between the tapered intermediate portion of said screw and the surrounding tapering wall of said barrel.

2. A screw extrusion machine for milling and then extruding stock such as rubber and synthetic thermoplastics, comprising a feed screw comprising a front portion, a rear portion of large diameter compared with that of the front portion and a tapered intermediate portion between said front and rear portions, a barrel comprising front and rear portions respectively corresponding in diameter to the front and rear portions of said screw and an intermediate portion having a tapering wall, said barrel having a feed opening at its rear end and means for mounting a delivery head at its front end, means for supporting said screw rotatably within said barrel, said supporting means including a thrust bearing, an externally screw-threaded housing for said thrust bearing, an internally screw threaded fixed support for said housing and means for imparting angular movement to said housing in said fixed support for the purpose of adjusting the axial position of the feed screw within said barrel to vary the clearance between the tapered intermediate portion of said screw and the tapering wall of the intermediate part of said barrel.

3. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, at least one of said portions being rotatable relative to an adjoining portion of said feed screw, a barrel having a feed opening at its rear end and means for mounting a delivery head at its front end, said barrel comprising front and rear portions, of which the bore diameters respectively correspond to the diameters of the front and rear portions of said feed screw, and an intermediate portion having a tapering wall, means for supporting said feed screw rotatably within said barrel, means for driving one of said relatively rotatable portions of said feed screw in said barrel, means for driving an adjoining relatively rotatable portion of said feed screw in rotation in said barrel independently of said portion driven by the first said driving means and means for axially adjusting the intermediate portion of said screw within said barrel forwards and rearwards to a limited extent to reduce and increase, respectively, the clearance between it and the surrounding tapering wall of said barrel.

4. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, said front portion being rotatable relative to said intermediate and rear portions, a barrel having a feed opening at its rear end and means for mounting a delivery head at its front end and comprising front and rear portions of which the bore diameters respectively correspond to the diameters of the front and rear portions of said screw and an intermediate portion having a tapering wall, means for supporting said screw rotatably within said barrel, means for driving said intermediate and rear portions of said screw in rotation in said barrel, means for driving said front portion of said screw in rotation in said barrel independently of said intermediate and rear portions of said feed screw and means for axially adjusting the intermediate portion of said screw within said barrel forwards and rearwards to a limited extent to reduce and increase, respectively, the clearance between it and the surrounding tapering wall of said barrel.

5. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, said front portion being rotatable relative to said intermediate and rear portions, a barrel having a feed opening at its rear end and means for mounting a delivery head at its front end and comprising front and rear portions of which the bore diameters respectively correspond to the diameters of the front and rear portions of said screw and an intermediate portion having a tapering wall, axially adjustable supporting means for supporting said intermediate and rear portions of said screw rotatably within said intermediate and rear portions of said barrel, means for driving said intermediate and rear portions of said screw in rotation in said intermediate and rear portions of said barrel, means for supporting said front portion of said screw rotatably within said front portion of said barrel, said supporting means for said front portion comprising a torque tube passing through an axial bore in the intermediate and rear portions of said feed screw and through the said means for supporting them, and means to the rear of the means for supporting the intermediate and rear portions of said feed screw for driving said torque tube in rotation about its axis to rotate said front portion of said feed screw in said front portion of said barrel independently of said intermediate and rear portions of said feed screw.

6. A screw extrusion machine for milling and extruding stock such as rubber and synthetic thermoplastics, comprising a main housing having side walls and front and rear end walls, a barrel mounted on the front end wall of said main housing and having a stepped bore comprising a cylindrical front portion, a cylindrical rear portion of large diameter compared with that of the front portion and a relatively short intermediate portion of conical form having at its rear end a diameter corresponding to that of the rear portion and at its front end a diameter corresponding to that of the front portion, a feed screw working in the stepped bore of said barrel with small clearances and comprising a portion working in the front portion of the bore of the barrel separate from an intermediate portion and a rear portion respectively working in the conical and rear portions of the bore of the barrel, a tubular spigot on the rear portion of said feed screw projecting from the rear end of said barrel and through the front end wall of said main housing, a rotatably supported and axially adjustable driving sleeve in said main housing for receiving said tubular spigot, a driving shaft supported in bearings in said main housing and extending transversely to said driving sleeve and projecting through a side wall of said main housing, gearing coupling said driving shaft with said driving sleeve, a tubular extension on the front portion of said feed screw passing rearwards through the intermediate and rear portions of said screw, through said tubular spigot and said driving sleeve and projecting beyond said driving sleeve and forming a torque tube, a second rotatably supported driving sleeve for receiving the projecting end of said torque tube, a second driving shaft supported in bearings in said main housing and extending transversely to said second driving sleeve and projecting through a side wall of said main housing, and gearing coupling said second driving shaft with said second driving sleeve.

7. A screw extrusion machine as specified in claim 6, wherein the first driving sleeve is rotatably supported at its front end by a bearing in the front end wall of said main housing and at its rear end by a thrust bearing and a journal bearing housed in a sleeve supported by and axially adjustable relative to a transverse wall extending within the main housing from one side wall to the other side wall of said main housing.

8. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, said front portion being rotatable relative to said intermediate and rear portions, a barrel having a feed opening at its rear end and means for mounting a delivery head at its front end and comprising front and rear portions of which the bore diameters respectively correspond to the diameters of the front and rear portions of said screw and an intermediate portion having a tapering wall, means for supporting said screw rotatably within said barrel, means for driving said intermediate and rear portions of said screw in rotation in said barrel, means for driving said front portion of said screw in rotation in said barrel independently of said intermediate and rear portions of said feed screws, means for axially adjusting the intermediate portion of said screw within said barrel forwards and rearwards to a limited extent to reduce and increase, respectively, the clearance between it and the surrounding tapering wall of said barrel and separate heat-exchanging means for controlling the temperature of the said front portion of said feed screw and the temperature of the rear portion of said feed screw independently of one another.

9. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, at least one of said portions being rotatable relative to an adjoining portion of said feed screw, a seal between said relatively rotatable portions of said feed screw, a barrel having a feed opening at its rear end and means for mounting a delivery head at its front end and comprising front and rear portions of which the bore diameters respectively correspond to the diameters of the front and rear portions of said feed screw and an intermediate portion having a tapering wall, means for supporting said feed screw rotatably within said barrel, means for driving one of said relatively rotatable portions of said feed screw in said barrel, means for driving an adjoining relatively rotatable portion of said feed screw in rotation in said barrel independently of said portion driven by the first said driving means and means for axially adjusting the intermediate portion of said screw within said barrel forwards and rearwards to a limited extent to reduce and increase, respectively, the clearance between it and the surrounding tapering wall of said barrel.

10. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, at least one of said portions being rotatable relative to an adjoining portion of said feed screw, a seal between said relatively rotatable portions of said feed screw comprising a carbon ring seating on a surface of one of said relatively rotatable portions, a second carbon ring seating on a surface of the adjoining relatively rotatable portion of said feed screw and a resilient externally channelled metal ring having edges adapted to be held against said carbon rings by pressure of stock in the channel of said metal ring, a barrel having a feed opening at its rear end and means for mounting a delivery head at its front end and comprising front and rear portions of which the bore diameters respectively correspond to the diameters of the front and rear portions of said feed screw and an intermediate portion having a tapering wall, means for supporting said feed screw rotatably within said barrel, means for driving one of said relatively rotatable portions of said feed screw in said barrel and means for driving an adjoining relatively rotatable portion of said feed screw in rotation in said barrel independently of said portion driven by the first said driving means.

11. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, at least one of said portions being rotatable relative to an adjoining portion of said feed screw, a barrel having a feed opening at its rear end and means for mounting above said feed opening any one of a number of interchangeable forced feeding devices of various kinds and having means for mounting a delivery head at its front end and comprising front and rear portions of which the bore diameters respectively correspond to the diameters of the front and rear portions of said feed screw, and an intermediate portion having a tapering wall, means for supporting said feed screw rotatably within said barrel, means for driving one of said relatively rotatable portions of said feed screw in said barrel, means for driving an adjoining relatively rotatable portion of said feed screw in rotation in said barrel independently of said portion driven by the first said driving means and means for axially adjusting the intermediate portion of said screw within said barrel forwards and rearwards to a limited extent to reduce and increase, respectively, the clearance between it and the surrounding tapering wall of said barrel.

12. A screw extrusion machine for milling and then extruding stock such as rubber and synthetic thermoplastics, comprising a feed screw comprising a front portion, a rear portion of large diameter compared with that of said front portion and a tapered intermediate portion between said front and rear portions, a barrel of corresponding form to said feed screw and surrounding it with a small clearance, and comprising front and rear portions and an intermediate portion having a tapering wall, said barrel having a feed opening at its rear end and means for mounting a delivery head at its front end, means for rotatably supporting said screw in said barrel and means for axially adjusting the intermediate and rear portions of said screw relative to the front part and to the barrel to a limited extent to vary the clearance between the tapered intermediate portion of said screw and the surrounding tapering wall of said barrel.

References Cited in the file of this patent

UNITED STATES PATENTS

| | | |
|---|---|---|
| 156,188 | Tiffany | Oct. 20, 1874 |
| 320,865 | Frey | June 23, 1885 |
| 1,156,096 | Price | Oct. 12, 1915 |
| 1,337,871 | Wolff | Apr. 20, 1920 |
| 2,257,067 | Parsons | Sept. 23, 1941 |
| 2,595,455 | Heston | May 6, 1952 |
| 2,607,953 | Richardson et al. | Aug. 26, 1952 |
| 2,653,350 | Piperoux | Sept. 29, 1953 |
| 2,653,351 | Henning | Sept. 29, 1953 |

FOREIGN PATENTS

| | | |
|---|---|---|
| 623,673 | Germany | Dec. 31, 1935 |